United States Patent
Sinha et al.

(10) Patent No.: US 9,131,061 B2
(45) Date of Patent: Sep. 8, 2015

(54) CALL HANDLING ACROSS SUBSCRIPTIONS IN DUAL SIM DUAL ACTIVE (DSDA) DEVICES VIA SHORT RANGE WIRELESS

(71) Applicant: QUALCOMM Incorporated, San Diego, CA (US)

(72) Inventors: Abhijeet Sinha, Hyderabad (IN); Atul Shukla, Hyderabad (IN); Nitin Sachdeva, Hyderabad (IN); Nitin Srivastava, Hyderabad (IN); Mallikarjuna Giriyapura Basavarajappa, Hyderabad (IN); Srikanth Chintala, Hyderabad (IN); Hanumanthu Ganji, Hyderabad (IN); Sandeep Gutta, Hyderabad (IN); Yau Mo Chan, San Diego, CA (US); Ling Hang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/147,952

(22) Filed: Jan. 6, 2014

(65) Prior Publication Data
US 2015/0195393 A1    Jul. 9, 2015

(51) Int. Cl.
*H04M 3/42* (2006.01)
*H04M 1/60* (2006.01)
*H04W 4/16* (2009.01)
*H04W 88/06* (2009.01)
*H04M 3/428* (2006.01)

(52) U.S. Cl.
CPC .......... *H04M 1/6066* (2013.01); *H04M 3/4283* (2013.01); *H04W 4/16* (2013.01); *H04W 88/06* (2013.01)

(58) Field of Classification Search
CPC ......... H04W 88/06; H04W 4/16; H04W 8/18; H04W 76/025; H04M 1/72519
See application file for complete search history.

(56) References Cited

U.S. PATENT DOCUMENTS

| | | | |
|---|---|---|---|
| 6,625,476 B1 * | 9/2003 | Perng | 455/569.1 |
| 8,068,883 B2 | 11/2011 | Matsuda | |
| 2006/0234693 A1 * | 10/2006 | Isidore et al. | 455/422.1 |
| 2008/0220825 A1 | 9/2008 | Wu | |
| 2009/0209297 A1 | 8/2009 | Suzuki | |

(Continued)

OTHER PUBLICATIONS

Bluetooth Doc: "Hands-Free Profile 1.6", May 10, 2011, pp. 1-126, XP055075631.

(Continued)

*Primary Examiner* — Kashif Siddiqui
*Assistant Examiner* — Minjung Kim
(74) *Attorney, Agent, or Firm* — Loza & Loza, LLP

(57) ABSTRACT

An audio gateway device may establish a wireless connection between the audio gateway device and the hands free device using a protocol supporting a single subscription. The audio gateway device may also establish a first call which terminates or originates at the hands free device via a first subscription. An outgoing call may be established via a second subscription by: (a) receiving a first indicator from the hands free device to switch subscriptions, where the first indicator does not specify a subscription; and (b) establishing an originating second call via the second subscription which originates at the hands free device. Similarly, an incoming call may be established via the second subscription by: (a) sending a second indicator to the hands free device of an incoming third call, where the second indicator does not specify a subscription; and (b) establishing the third call via the second subscription which terminates at the hands free device.

27 Claims, 11 Drawing Sheets

*Exemplary Operating Environment –*
*Audio Gateway and Hands Free Device*

(56) References Cited

U.S. PATENT DOCUMENTS

2009/0215491 A1   8/2009   Hou et al.
2012/0094602 A1   4/2012   Lee et al.

OTHER PUBLICATIONS

"Digital Cellular Telecommunications System (Phase 2+); Universal Mobile Telecommunications System (UMTS); LTE; AT Command set for user Equipment (UE) (3GPP TS 27.007 Version 11.8.0 Release 11)", Technical Specification, European Telecommunications Standards Institute (ETSI), 650, Route des Lucioles; F-06921 Sophia-Antipolis; France, vol. 3GPP CT, No. V11.8.0, Oct. 1, 2013, XP014157556.

International Search Report and Written Opinion—PCT/US2015/010228—ISA/EPO—Mar. 30, 2015.

\* cited by examiner

*Exemplary Operating Environment – Audio Gateway and Hands Free Device*

*Fourth Exemplary Approach - Hands Free Device Originates First Call on Subscription #1, Originates Second Call on Subscription #2, and Changes Preferred Subscription from the Hands Free Device*

*Fifth Exemplary Approach - Hands Free Device Originates First and Second Call on Subscription #1, Originates Third Call on Subscription #2 and Changes Preferred Subscription from Hands Free Device*

*Exemplary Method of Operation of Audio Gateway Device*

*Exemplary Method of Operation of Hands-Free Device*

CALL HANDLING ACROSS SUBSCRIPTIONS IN DUAL SIM DUAL ACTIVE (DSDA) DEVICES VIA SHORT RANGE WIRELESS

BACKGROUND

1. Field

The present disclosure pertains to communication devices incorporating multiple Subscriber Identity Modules (SIMs), and more particularly, to techniques that permit hand free devices to manage multiple calls from different SIMs.

2. Background

Communication devices, including mobile/wireless communication devices, mobile phones, smartphones, etc., may include multiple subscriber accounts. For instance, Dual SIM devices (e.g., Dual SIM Dual Standby DSDS, Dual SIM Dual Active DSDA, etc.) permit a communication device to communicate using different subscriber accounts and/or networks. Each SIM may be associated with a different subscriber account, a different network, and/or a radio access technology (RAT).

Many communication devices are adapted with short range or near field wireless communication capabilities to allow the exchange of voice and/or data communications. For example, many mobile phone devices are enabled with Bluetooth interfaces that allow a mobile phone device to send and/or receive audio and/or data to/from a Bluetooth-enabled device. This enables what is commonly referred to as "hands free" operation of a device.

In Bluetooth terminology, a mobile phone is often called an audio gateway (AG) and the wireless headsets or car kits are called often referred to a hands free unit (HF). The AG and HF communicate with each device using standard (Global System for Mobile Communication (GSM) Attention (AT) commands. Only an HF is designed to send any AT commands (e.g., ATA, ATD, AT+CHLD).

Bluetooth Hands free Profile 1.6 (HFP 1.6) is a technical specification designed by Bluetooth SIG https://bluetooth.org. The current Bluetooth Hands free Profile is designed to handle single SIM call scenarios with call states: one active, one held call, and one incoming call (e.g., three calls total) at one instant of time. No additional states beyond this transitory three-call state is possible when using a single SIM. Note that the maximum acceptable final state could be one active and one held (i.e., two calls total).

DSDA devices are able to support up to six (6) calls on two subscriptions. For instance, a first subscription SUB-A may support 1 active call, 1 held call, and 1 incoming call, while a second subscription SUB-B may support 1 active call, 1 held call, 1 incoming call. With these multi-SIM communication devices, no mechanism is currently available to allow a HF device to handle calls from two or more SIMS (subscriptions). That is, this call state (e.g., from multiple SIMs) cannot be conveyed to the HF device with the current Bluetooth HFP specification. Additionally, under the HFP 1.6 specification, no mechanism currently exists to allow conveying subscription information to the HF device from the AG device.

Consequently, there is a need for ways to permit a HF device to select calls in multi-call scenarios, especially in the context of multi-SIM devices.

SUMMARY

A method operational on a multi-subscriber identity module audio gateway device is provided. A wireless connection may be established between the audio gateway device and a hands free device using a protocol supporting a single subscription. A first call may be established which terminates or originates at the hands free device via a first subscription. An outgoing call may be setup via a second subscription by: (a) receiving a first indicator from the hands free device to switch subscriptions, where the first indicator does not specify a subscription; and/or (b) establishing an originating second call via the second subscription which originates at the hands free device. The first call may be placed on hold when the second call is established.

An incoming call may be setup via the second subscription by: (a) sending a second indicator to the hands free device of an incoming third call, where the second indicator does not specify a subscription; and/or (b) establishing the third call via the second subscription which terminates at the hands free device. The second call may be placed on hold when the third call is established. In one example, the first indicator and second indicator may reuse a command from the protocol.

The audio gateway device may maintain status information for all calls and subscriptions on behalf of the hands free device. The first indicator may indicate a relative switch from a current subscription to another subscription (e.g., without specifying a particular subscription). No subscription information is transmitted from the audio gateway device to the hands free device.

The audio gateway device may be communicatively coupled to a wireless network, distinct from the wireless connection with the hands free device, through which voice calls are transmitted to and from the audio gateway device.

In one example, the audio gateway device may manage calls for two or more subscriptions where such calls originate or terminate at the hands free device but without conveying subscription information to the hands free device. In another example, the audio gateway device manages calls for two or more subscriptions where such calls originate or terminate at the hands free device but without identifying a specific subscription to the hands free device.

Similarly, an audio gateway device may be provided comprising: a first wireless communication interface, a second wireless communication interface, a first subscriber identity module, a second subscriber identity module, and/or a processing circuit. The first wireless communication interface may serve to communicate with a telephony network. The second wireless communication interface may serve to communicate with a hands free device. The first subscriber identity module may facilitate calls via a first subscription. The second subscriber identity module may facilitate calls via a first subscription. The processing circuit may be coupled to the first wireless communication interface, the second wireless communication interface, the first subscriber identity module, and the second subscriber identity module. The processing circuit may be configured to: (a) establish a wireless connection between the audio gateway device and the hands free device using a protocol supporting a single subscription; (b) establish a first call which terminates or originates at the hands free device via the first subscription; (c) setup an outgoing call via the second subscription by: (1) receiving a first indicator from the hands free device to switch subscriptions, where the first indicator does not specify a subscription; and/or (2) establishing an originating second call via the second subscription which originates at the hands free device; and (d) setup an incoming call via the second subscription by: (1) sending a second indicator to the hands free device of an incoming third call, where the second indicator does not specify a subscription; and/or (2) establishing the third call via the second subscription which terminates at the hands free device.

A method operational on a hands free device is also provided. A wireless connection may be established between the hands free device and an audio gateway device using a protocol supporting a single subscription. A first call may also be established which terminates or originates at the hands free device via a first subscription. An outgoing call may be setup via a second subscription by: (a) sending a first indicator to the audio gateway device to switch subscriptions, where the first indicator does not specify a subscription; and/or (b) establishing an originating second call via the second subscription which originates at the hands free device. Similarly, an incoming call via a second subscription by: (a) receiving a second indicator at the hands free device of an incoming third call, where the second indicator does not specify a subscription; and/or (b) establishing the third call via the second subscription which terminates at the hands free device. The first indicator may indicate a relative switch from a current subscription to another subscription. The hands free device may receive no subscription information from the audio gateway device.

Similarly, a hands free device is provided, comprising: a first wireless communication interface to communicate with an audio gateway device; and a processing circuit coupled to the first wireless communication interface. The processing circuit may be configured to: (a) establish a wireless connection between the hands free device and the audio gateway device using a protocol supporting a single subscription; (b) establish a first call which terminates or originates at the hands free device via a first subscription; (c) setup an outgoing call via a second subscription by: (1) sending a first indicator to the audio gateway device to switch subscriptions, where the first indicator does not specify a subscription; and/or (2) establishing an originating second call via the second subscription which originates at the hands free device; and/or (d) setup an incoming call via the second subscription by: (1) receiving a second indicator at the hands free device of an incoming third call, where the second indicator does not specify a subscription; and/or (2) establishing the third call via the second subscription which terminates at the hands free device.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

A method is provided for a hands free device adapted for single subscriber operation to be able to support calls on multiple subscriptions. An audio gateway device may facilitate calls from multiple subscriptions with the hands free device without specifying specific subscription information to the hands free device. The audio gateway device may keep track of a currently selected subscription, since the hands free device is unable to do so. The audio gateway device and hands free device may then switch between subscriptions without actually identifying a subscription. This allows the hands free device to communicate over at least two different subscriptions without the need to specify a subscription as the audio gateway device keeps track of the current subscription state.

Exemplary Operating Environment

In existing solutions for single-SIM devices, the AG and HF communicate with each other using standard GSM AT commands. Only the HF is designed to send any AT commands (e.g., ATA, ATD, AT+CHLD).

Figure 1:
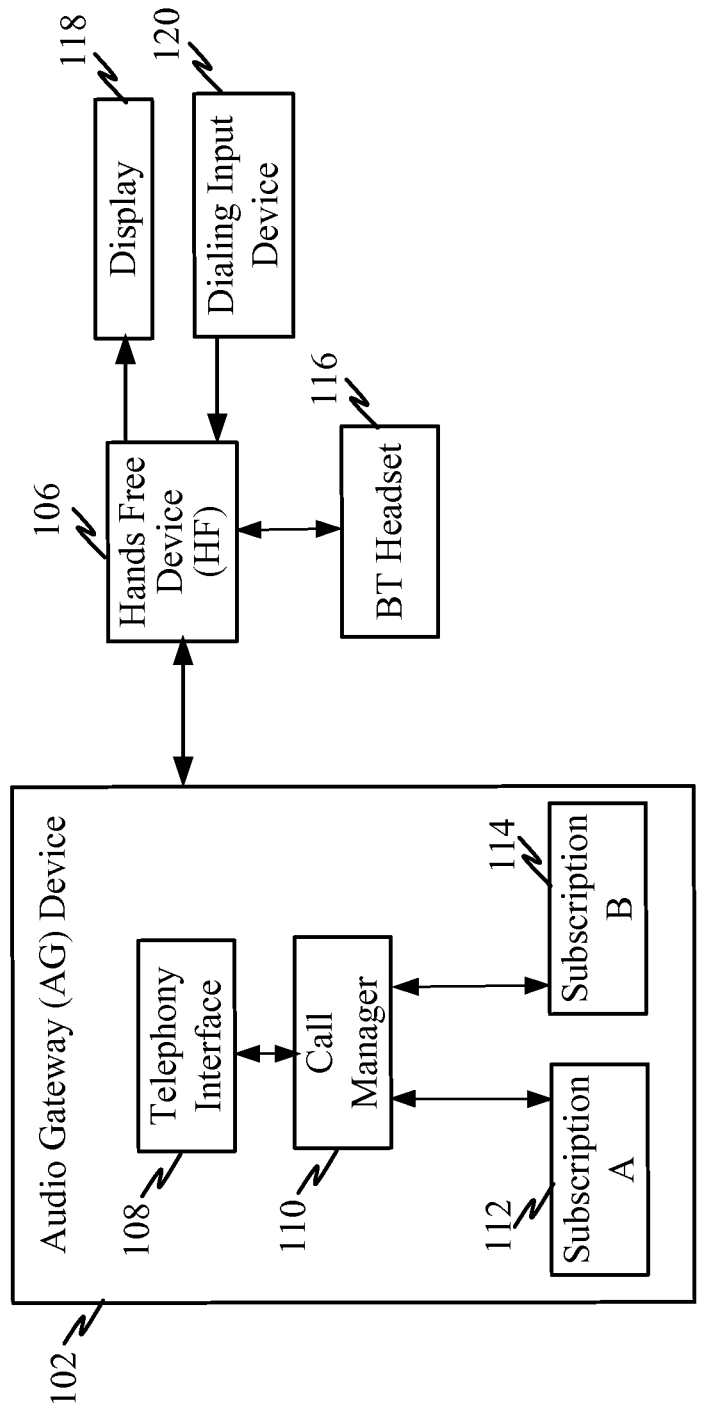
FIG. 1 is a block diagram illustrating an audio gateway (AG) device having multiple subscriptions and that permits a hands free (HF) device to support switching between the subscriptions.

FIG. 1 is a block diagram illustrating an audio gateway (AG) device 102 (e.g. mobile phone) having multiple subscriptions 112 and 114 (e.g., multiple SIMs) and that permits a HF device 106 to support switching between the subscriptions 112 and 114. The call manager 110 manages calls for the subscriptions 112 and 114 and communicates with the HF device 106. In this example the HF device 106 may include or is coupled to a Bluetooth (BT) headset 116. A telephony interface 108 is configured to act as an interface between the call manager 110 and HF device 106. The HF device 106 may include a display device 118 (e.g., to display an incoming call indicator) and a dialing input device 120, such as a keypad, to dial a number for an outgoing call.

The audio gateway device 102 may be, for example a mobile phone, smartphone, or other communication device that may connect with a wireless network (e.g., a subscriber network) for voice and/or data communication services. The HF device 106 may be an electronic device that is capable of communicating with the audio gateway device 102 to obtain an audio signal (e.g., obtained as a stream of data packets or an inaudible analog signal from the audio gateway device 102) and play the audio signal over audio transducers (e.g., headset, earphones, etc.). Additionally, the HF device 106 may also capture audio via a microphone and forward the audio (e.g., as a stream of data packets or an inaudible analog signal) to the audio gateway device 102. The HF device 106 may also be capable of instructing the AG device 102 to instruct the AG device 102 to switch between calls, receive an indication of an incoming call from the AG device 102, and/or send an indication of an outgoing call to the AG device 102.

Various solutions are described herein to allow the HF device 106 to handle calls from multiple subscriptions despite limitations in the Bluetooth Hands free Profile 1.6 which does not support such operation. In particular, the HF device 106 (e.g., operating according to Bluetooth Hands free Profile 1.6) may not support or have knowledge of multiple subscriptions.

According to one aspect, the AG device 102, which has knowledge of all available subscriptions, may be configured to recognize the current call state(s) of the calls for the HF device 106 on a first subscription (e.g., one or more calls in active, held, or incoming states), provide an incoming call indicator to the HF device 106 for a new call on a second subscription, and automatically/transparently switch subscriptions to allow the HF device to attend to the new incoming call. Since the HF device 106 is not capable of obtaining information for multiple subscriptions, the AG device 102 maintains call status information on behalf of the HF device 106, including current/preferred subscription. Therefore, the HF device 106 need not have specific knowledge of subscription information for one or more subscriptions on the AG device 102.

According to another aspect, a messaging mechanism is provided that permits switching subscriptions without necessarily identifying individual subscriptions. This may be done by reusing existing messages or indicators to/from the HF device 106 while the AG device 102 tracks the state of a preferred subscription.

Exemplary Solution Scenarios

According to a first problem, an AG device that is Dual SIM Dual Active (DSDA), has a first subscription SUB-A with active first voice call (call#1) dialed through the HF device and receives an incoming second voice call (call#2) on second subscription (SUB-B). When using a typical HF device, it is not possible to attend (e.g., answer) the terminating second voice call on SUB-B although it can be rejected using the HF device. However, the AG device has knowledge of the incoming second voice call and can also attend to it (e.g., answer, hold, or reject the incoming second voice call).

Figure 2:
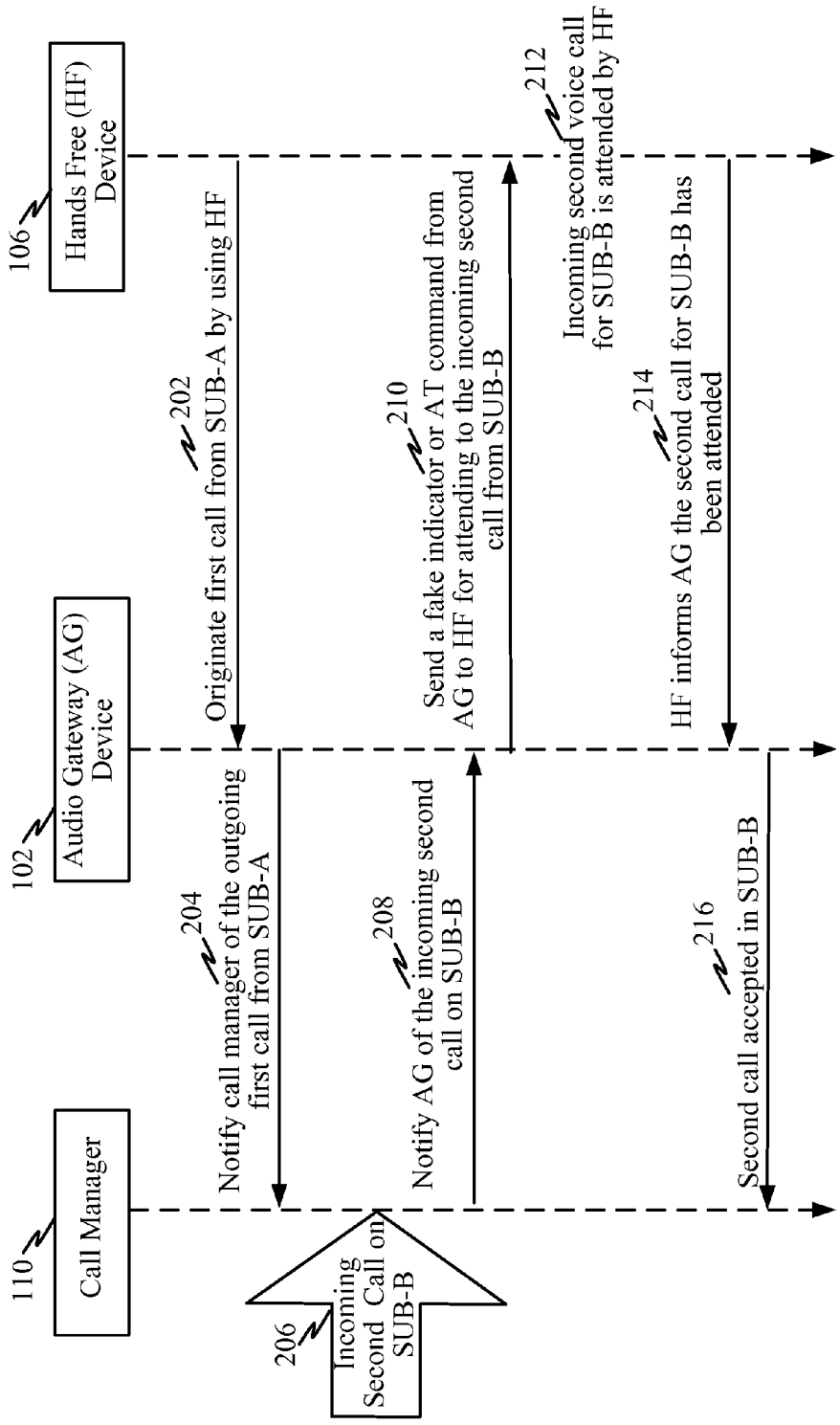
FIG. 2 illustrates a first exemplary approach in which a HF device is able originate a first call on a first subscription while receiving a second call from a second subscription of an AG device.

FIG. 2 illustrates a first exemplary approach in which a HF device is able originate a first call on a first subscription while receiving a second call from a second subscription of an AG device. The HF device 106 may originate a first call from a first subscription SUB-A 202. The AG device 102 notifies the call manager 110 of the outgoing first call from SUB-A 204. Then, an incoming second call on a second subscription SUB-B is received 206 by the call manager 110. The call manager 110 notifies the AG device 102 of the incoming second call on SUB-B 208. The AG device 102 then sends a fake indicator or command (e.g., attention or AT command) to the HF device 106 for attending to the incoming second call from the second subscription SUB-B 210. The HF device 106 may then attend (e.g., answer) the incoming second voice call for the second subscription SUB-B 212 and informs the AG device 102 that the second call has been attended 214. The AG device 102 may then inform the call manager 110 that the second call has been accepted on the second subscription SUB-B 216.

In this example, the AG device 102 (telephony interface 108) is configured to: (1) recognize that the HF device 106 already has a first call on a first subscription SUB-A, and (2) send a fake indicator or command to the HF device 106 when an incoming second call is received via a second subscription SUB-B, allowing the HF device 106 to answer the incoming second call. In one example, the AG device 102 sends the indication of the incoming second call to the HF device 106 irrespective of the subscription (i.e., without telling the HF device that the incoming second call is from a second subscription SUB-B). For instance, the fake indicator or AT command may simply indicate an incoming second call and that the first call should be placed on hold. In this manner, the HF device 106 is able to receive the incoming second call by holding or disconnecting all of the calls (i.e., the originated first call) on the first subscription SUB-A.

According to a second problem, an AG device that is Dual SIM Dual Active (DSDA), has a first subscription SUB-A with a first voice call dialed through the HF device and also a second voice call again dialed through HF device over the first subscription SUB-A. In that case, the first call of SUB-A will be on hold and the second call from SUB-A will be active. Then an incoming third voice call is received by a call manager on a second subscription SUB-B. In this case, the HF device is not able to receive any indication for terminating the third voice call for the second subscription SUB-B. Consequently, the HF device is not able to attend to the incoming third call via the second subscription SUB-B.

Figure 3:
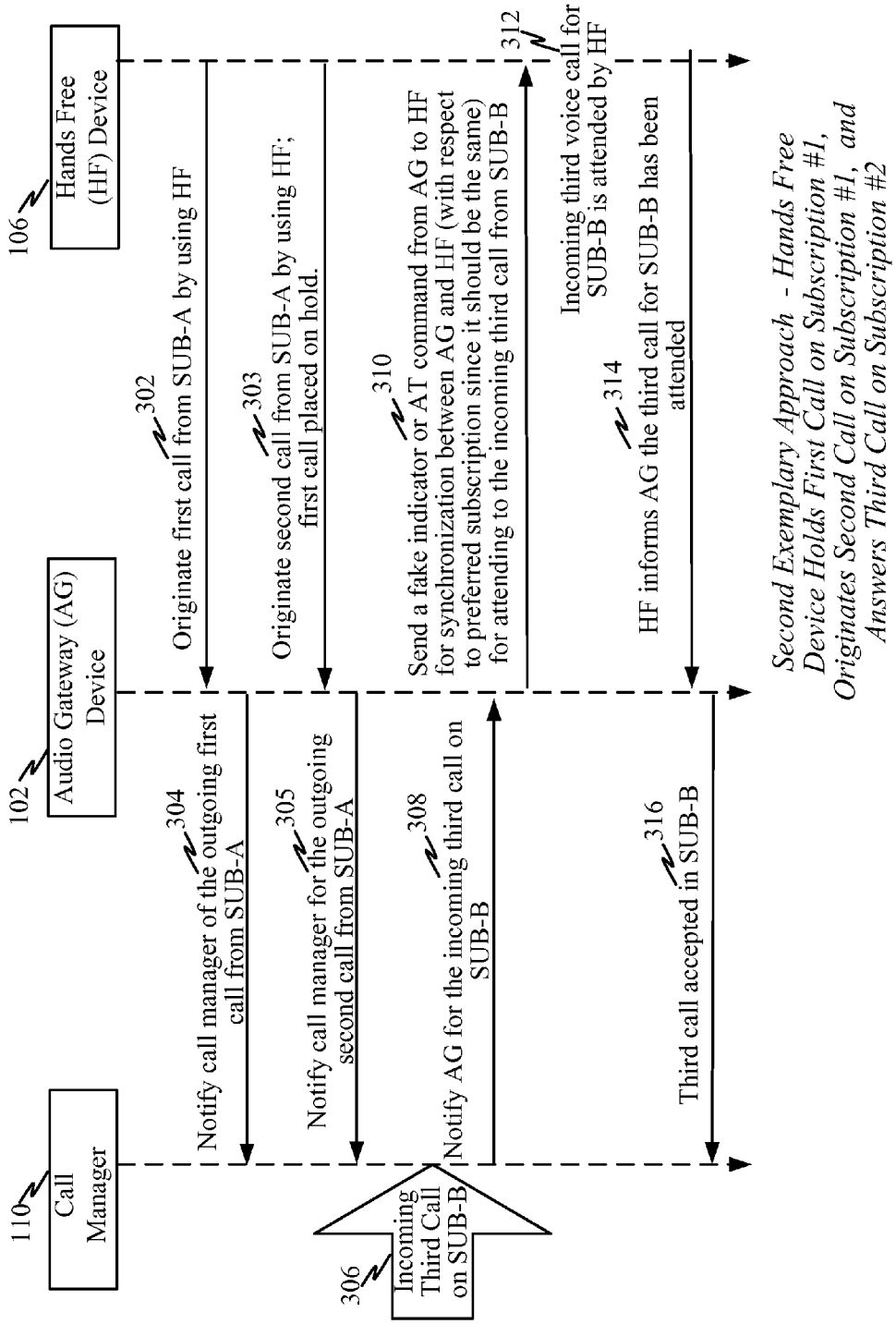
FIG. 3 illustrates a second exemplary approach in which a HF device is able originate a first call and a second call, both on a first subscription, while receiving a third call from a second subscription of an AG device.

FIG. 3 illustrates a second exemplary approach in which a HF device is able originate a first call and a second call, both on a first subscription, while receiving a third call from a second subscription of an AG device. The HF device 106 may originate a first call from a first subscription SUB-A 302. The AG device 102 notifies the call manager of the outgoing first call from SUB-A 304. The HF device 106 may subsequently originate a second call from the first subscription SUB-A 303. The AG device 102 may similarly notify the call manager 110 of the outgoing second call from SUB-A 305. In this instance, the first call may have been placed on hold by the HF device.

Then, an incoming third call on a second subscription SUB-B is received 306 by the call manager 110. The call manager 110 notifies the AG device 102 of the incoming third call on SUB-B 308. The AG device 102 then sends a fake indicator or AT command to the HF device 106 for synchronization between AG device 102 and HF device 106 (i.e., with respect to preferred subscription since it should be the same) for attending to incoming third call from the second subscription SUB-B 310. The HF device 106 may then attend (e.g., answer) the incoming third voice call for the second subscription SUB-B 312 and informs the AG device 102 that the second call has been attended 314. The AG device 102 may then inform the call manager 110 that the third call has been accepted on the second subscription SUB-B 316.

In this example, the AG device 102 (telephony interface 108) is configured to: (1) recognize that the HF device 106 already has a first call and/or second call on a first subscription SUB-A (e.g., either active and/or held), and (2) send a fake indicator or command to the HF device 106 when an incoming third call is received via a second subscription SUB-B, allowing the HF device 106 to answer the third call. In one example, the AG device 102 sends the indication of the incoming third call to the HF device 106 irrespective of the subscription (i.e., without telling the HF device that the incoming third call is from a second subscription SUB-B). For instance, the fake indicator or command (e.g. AT command) may simply indicate an incoming third call and that the first call and/or second call should be placed on hold. In this manner, the HF device 106 is able to receive the third call by holding or disconnecting the first and/or second calls on the first subscription SUB-A (or placing the second call on hold and disconnecting the first call, etc.).

According to a third problem, an AG device may be Dual SIM Dual Active (DSDA). However, there is no option at the moment to indicate to the HF device which is a preferred subscription (e.g., first subscription SUB-A or second subscription SUB-B) on the AG device. Consequently, the HF device does not have an option to select from which subscription to make an originating call. Also, by dialing a call through the HF will go through the default preferred subscription selected by the AG device (e.g., first subscription SUB-A). If the HF device wants to dial a second originating call from a second subscription SUB-A, there is no option in the HF device to permit doing so unless the subscription preference is changed at the HF device (e.g., from the first subscription SUB-A to the second subscription SUB-B).

Figure 4:
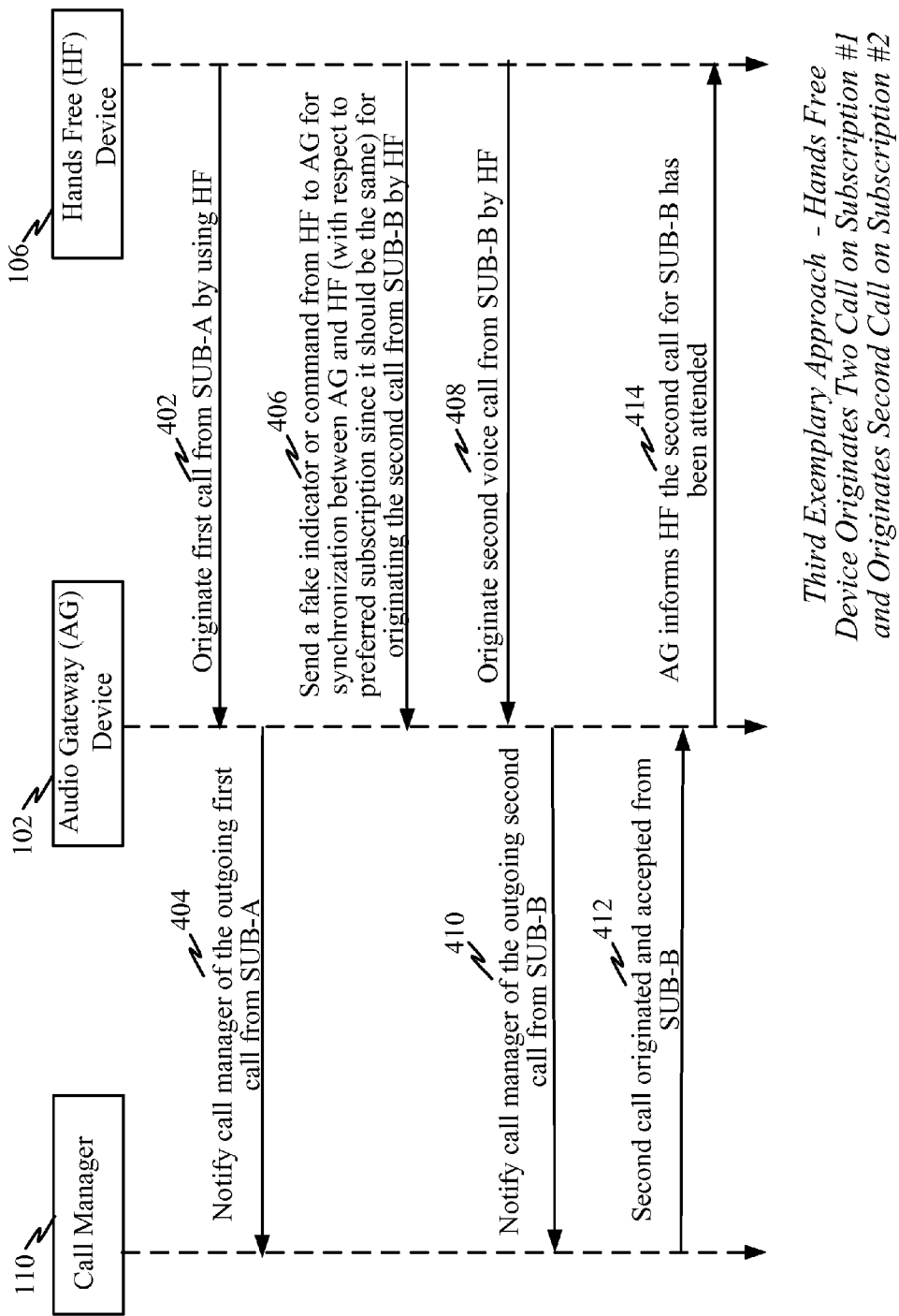
FIG. 4 illustrates a third exemplary approach in which a HF device is able to originate a first call on a first subscription and subsequently originate a second call from a second subscription of an AG device.

FIG. 4 illustrates a third exemplary approach in which a HF device is able to originate a first call on a first subscription and subsequently originate a second call from a second subscription of an AG device. The HF device 106 may originate a first call from a first subscription SUB-A 402. The AG device 102 notifies the call manager of the outgoing first call from SUB-A 404.

Then, the HF device 106 may wish to originate a second call on a second (different) subscription SUB-B. To do this, the HF device 106 sends a fake indicator or command to the AG device 102 for synchronization between AG and HF (with respect to the preferred subscription since it should be the same) for originating the second call from the subscription SUB-B 406 by the HF device 106. That is, the HF device 106 may indicate a switch of subscriptions without necessarily identifying a particular subscription to be used. For example, if the current/preferred subscription is the first subscription SUB-A, the synchronization message 406 from the HF device would cause a switch to the second subscription SUB-B (if available). The AG device 102 keeps track of which is the current/preferred subscription (e.g., SUB-A or SUB-B) since the HF device 106 is not capable of doing so and/or has no specific knowledge of the multiple subscriptions. Thus, the synchronization message 406 may simply request a change of subscriptions, not to change to a specific subscription since the HF device has not knowledge of specific subscriptions. The HF device 106 may then originate a second voice call from the second subscription SUB-B 408.

The AG device 102 notifies the call manager 110 of the outgoing second call on SUB-B 410. The call manager 110 may then notify the AG device 102 that the second call has been originated and accepted from the second subscription SUB-B 412. The AG device 102 may then inform the HF device 106 that the second call has been attended on the second subscription SUB-B 414.

In this example, the AG device 102 (telephony interface 108) is configured to: (1) recognize that the HF device 106 already has a first call on a first subscription SUB-A, and (2) allows the HF device to switch to a second subscription SUB-B by sending a fake indicator or command to the AG device 102 to change the activate subscription SUB-A to the second subscription SUB-B at the AG device 102. In this manner, the HF device 106 is able to indicate to the AG device 102 to switch subscriptions, thereby facilitating subscription synchronization between the AG device and HF device.

According to a fourth problem, an AG device that is Dual SIM Dual Active (DSDA), has a first subscription SUB-A with an active first voice call dialed through the HF device and also a second voice call again dialed through HF device over a second subscription SUB-B. In that case, the first call of SUB-A will be on hold and the second call from SUB-B will be active. Currently, there is no option in the HF device to switch from the active second call (on SUB-B) to active the first call (on SUB-A) while placing the second call on hold.

Figure 5:
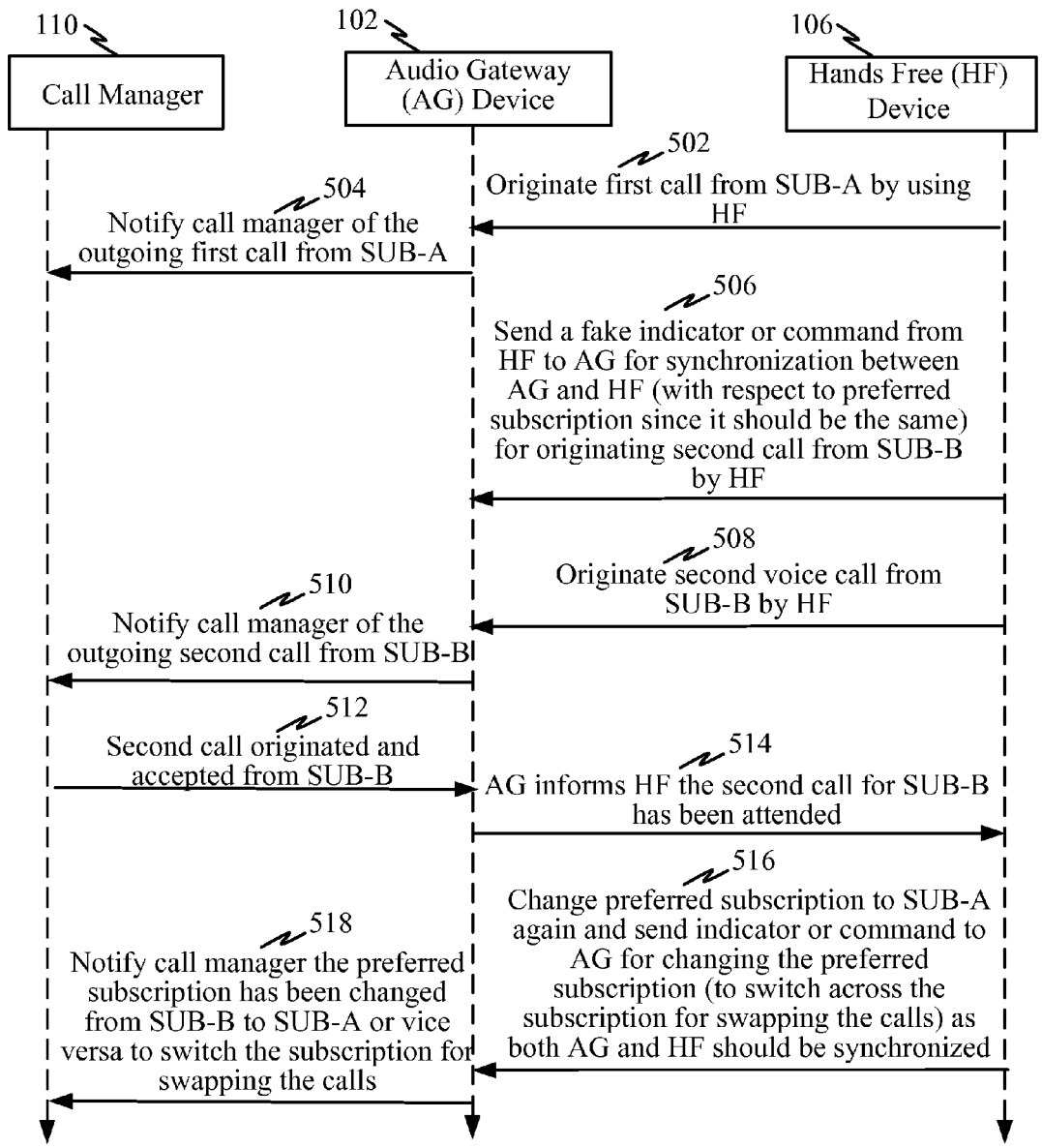
FIG. 5 illustrates a fourth exemplary approach in which a HF device is able to originate a first call on a first subscription and subsequently originate a second call from a second subscription of an AG device.

FIG. 5 illustrates a fourth exemplary approach in which a HF device is able to originate a first call on a first subscription and subsequently originate a second call from a second subscription of an AG device. The HF device 106 may originate a first call from a first subscription SUB-A 502. The AG device 102 notifies the call manager of the outgoing first call from the first subscription SUB-A 504.

Then, the HF device 106 may wish to originate a second call on a second (different) subscription SUB-B. To do this, the HF device 106 sends a fake indicator or command to the AG device 102 for synchronization between AG and HF (with respect to the preferred subscription since it should be the same) for originating the second call from the subscription SUB-B 506 by the HF device 106. The HF device 106 may then originate a second voice call from the second subscription SUB-B 508. The AG device 102 notifies the call manager 110 of the outgoing second call on the second subscription SUB-B 510. The first call over the first subscription SUB-A may be placed on hold while the second subscription SUB-B is active. The call manager 110 may then notify the AG device 102 that the second call has been originated and accepted from the second subscription SUB-B 512. The AG device 102 may then inform the HF device 106 that the second call has been attended on the second subscription SUB-B 514.

In order to switch back to the first call on the first subscription SUB-A, the HF device 106 may send an indicator or command to the AG device to change the preferred subscription and allow both the AG device and HF device to be synchronized 516. The AG device 102 may then notify the call manager 110 that the preferred subscription has been changed from the second subscription SUB-B to the first subscription SUB-A (or vice versa) to switch the subscription for swapping the calls 518.

In this example, the AG device 102 (telephony interface 108) is configured to: (1) recognize that the HF device 106 already has a first call on a first subscription SUB-A on hold and an active second call on a second subscription SUB-B, and (2) allows the HF device 106 to switch back to the first subscription SUB-A by sending a fake indicator or command to the AG device 102 to change and activate the first subscription SUB-A at the AG device 102. In this manner, the HF device 106 is able to indicate to the AG device 102 to switch subscriptions and facilitate subscription synchronization between the AG device and HF device. Note that the HF device 106 may not have knowledge of the existence of specific subscriptions. Instead, it relies on the AG device 102 to keep track of the current call status, corresponding subscription(s), and changing between subscriptions.

According to a fifth problem, an AG device that is Dual SIM Dual Active (DSDA), has a first subscription SUB-A with an active first voice call dialed through the HF device and also a second voice call again dialed through HF device over the first subscription SUB-A. In that case, the first call of SUB-A will be on hold and the second call from SUB-A will be active. The HF device 106 may then wish to initiate a third call over a second subscription SUB-B. To do this, the first call and second call (both over the first subscription SUB-A) will need to be placed on hold while the third call (over the second subscription SUB-B) will be active. However, currently there is no option in HF device to switch from the active third call (on SUB-B) to active either the first call or second call (both on SUB-A) while placing the third call (via SUB-B) on hold.

Figure 6:
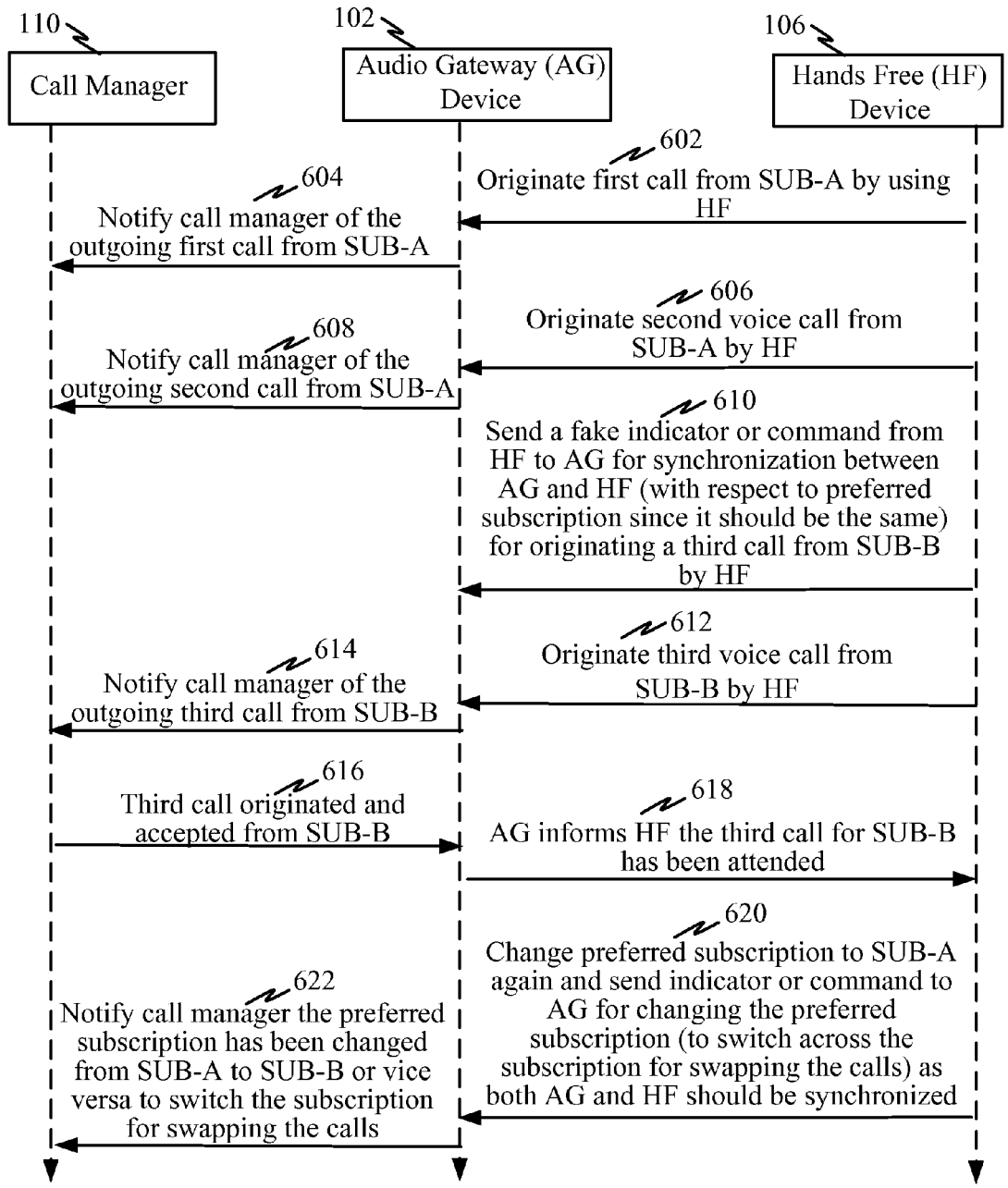
FIG. 6 illustrates a fifth exemplary approach in which a HF device is able to originate a first call and a second call on a first subscription and subsequently originates a third call from a second subscription of an AG device.

FIG. 6 illustrates a fifth exemplary approach in which a HF device is able to originate a first call and a second call on a first subscription and subsequently originates a third call from a second subscription of an AG device. The HF device 106 may originate a first call from a first subscription SUB-A 602. The AG device 102 notifies the call manager of the outgoing first call from SUB-A 604. The HF device 106 may also originate a second call from the first subscription SUB-A 606. The AG device 102 notifies the call manager 110 of the outgoing second call from SUB-A 608. When the second call is originated, the first call may be placed on hold.

The HF device 106 may wish to originate a third call on a second (different) subscription SUB-B. To do this, the HF device 106 sends a fake indicator or command to the AG device 102 for synchronization between AG and HF (with respect to the preferred subscription since it should be the same) for originating the third call from the subscription SUB-B 610 by the HF device 106. The HF device 106 may then originate a third voice call from the second subscription SUB-B 612. The AG device 102 notifies the call manager 110 of the outgoing third call on SUB-B 614. The second call over the first subscription SUB-A may be placed on hold while the third subscription SUB-B is active. The call manager 110 may then notify the AG device 102 that the third call has been originated and accepted from the second subscription SUB-B 616. The AG device 102 may then inform the HF device 106 that the third call has been attended on the second subscription SUB-B 618.

In order to switch back to the first call or second call on the first subscription SUB-A, the HF device 106 may send an indicator or command to the AG device to change the preferred subscription and allow both the AG device and HF device to be synchronized 620. The AG device 102 may then notify the call manager 110 that the preferred subscription has been changed from the second subscription SUB-B to the first subscription SUB-A (or vice versa) to switch the subscription for swapping the calls 622.

In this example, the AG device 102 (telephony interface 108) is configured to: (1) recognize that the HF device 106 already has a first call on a first subscription SUB-A on hold and an active second call on the first subscription SUB-A, and (2) allows the HF device 106 to switch back to the first subscription SUB-A by sending a fake indicator or command to the AG device 102 to change from the second subscription SUB-B and activate the first subscription SUB-A at the AG device 102. In this manner, the HF device 106 is able to indicate to the AG device 102 to switch subscriptions and facilitate subscription synchronization between the AG device 102 and HF device 106.

According to a sixth problem, an AG device that is Dual SIM Dual Active (DSDA), has a first subscription SUB-A with a terminating first voice call attended through the HF device and also a terminating second voice call again attended through HF device over the second subscription SUB-B. Currently, there is no option or provision in the HF device to attend the terminating second call (over SUB-B) although it can reject the second call.

Figure 7:
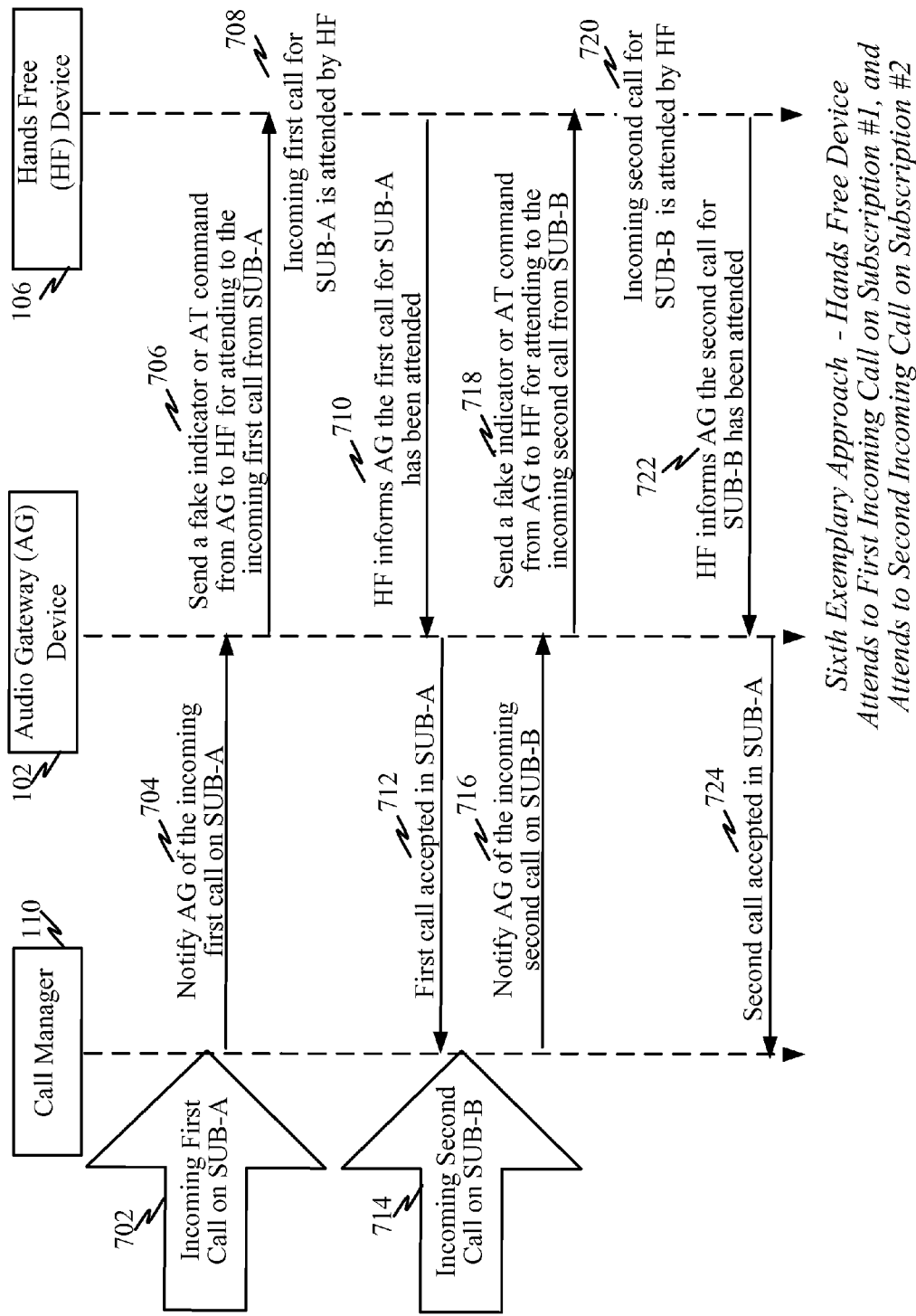
FIG. 7 illustrates a sixth exemplary approach in which a HF device is able to terminate a first call on a first subscription and subsequently terminate a second call on a second subscription of an AG device.

FIG. 7 illustrates a sixth exemplary approach in which a HF device is able to terminate a first call on a first subscription and subsequently terminate a second call on a second subscription of an AG device. The call manager 110 may receive an incoming first call on a first subscription SUB-A 702 and notifies the AG device of the incoming first call 704. The AG device 102 may send a fake indicator or AT command to the HF device for attending to the incoming first call from the first subscription SUB-A 706.

The HF device 106 may attend (answer) the incoming first call for SUB-A 708. The HF device 106 may then inform the AG device 102 that the first call from the first subscription SUB-A has been attended 710. In turn, the AG device 102 may inform the call manager 110 that the first call from the first subscription SUB-A has been accepted 712.

Similarly, the call manager 110 may receive an incoming second call on a second subscription SUB-B 714 and notifies the AG device of the incoming second call 716. The AG device 102 may send a fake indicator or AT command to the HF device 106 for attending to the incoming second call from the second subscription SUB-B 718.

The HF device 106 may attend (answer) the incoming second call for the second subscription SUB-B 720. The HF device 106 may then inform the AG device 102 that the second call from the second subscription SUB-B has been attended 722. In turn, the AG device 102 may inform the call manager 110 that the second call from the second subscription SUB-B has been accepted 724.

In this example, the AG device 102 (telephony interface 108) is configured to: (1) recognize that the HF device 106 already has a first call on a first subscription SUB-A and (2) send an indication to the HF device indicating a new incoming second call, where the indicator does not specifically identify a subscription, but simply that there is an incoming call so the first call should be placed on hold. Then the HF device should be able to receive the call by holding or disconnecting all the calls in the first subscription SUB-A.

Exemplary Audio Gateway Device and Method Operational Thereon

Figure 8:
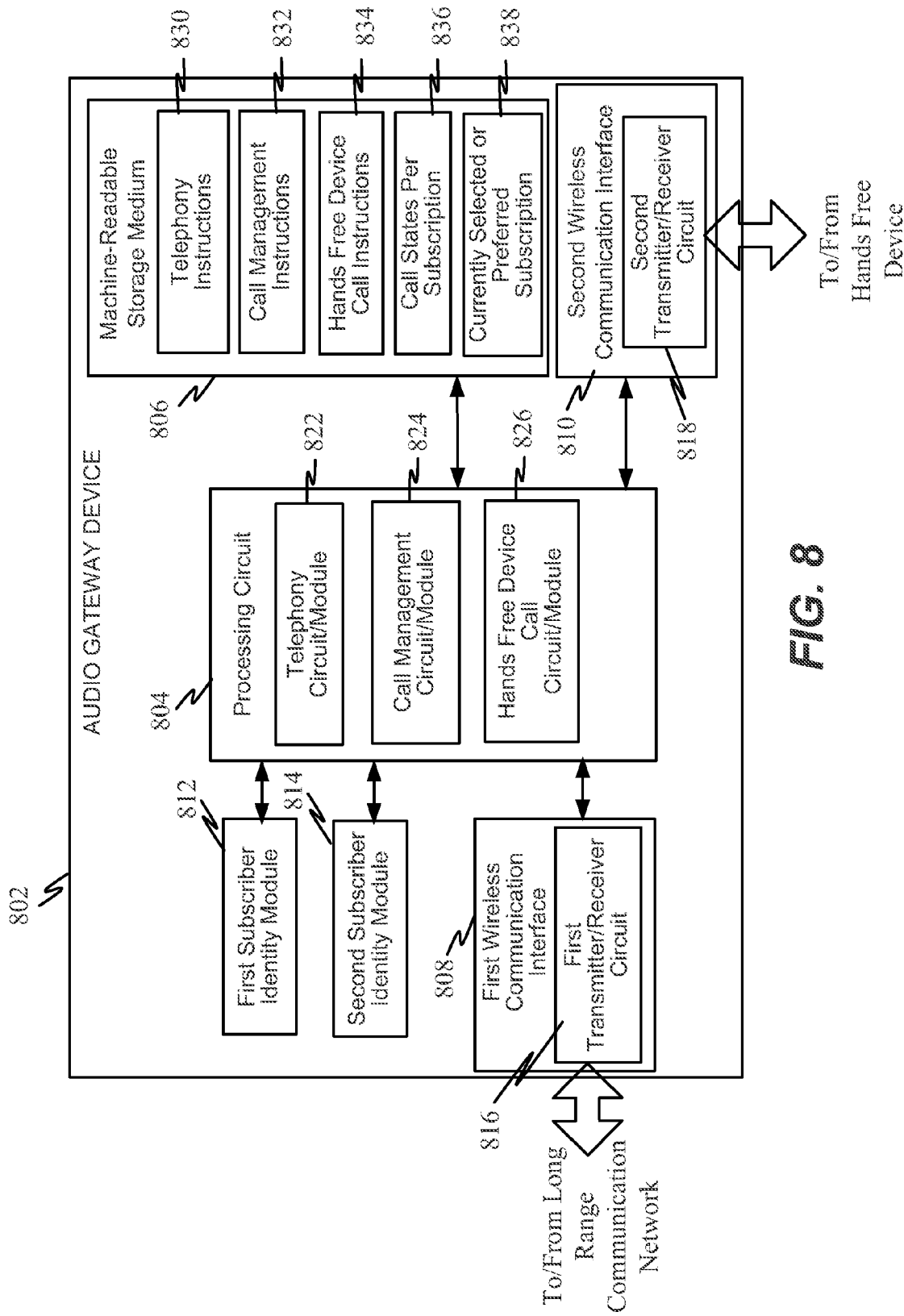
FIG. 8 is a block diagram illustrating an exemplary audio gateway device adapted to facilitate calls over multiple subscriptions for hands free devices that only support a single subscription.

FIG. 8 is a block diagram illustrating an exemplary audio gateway device adapted to facilitate calls over multiple subscriptions for hands free devices that only support a single subscription. The audio gateway device 802 may include a processing circuit 804, a machine-readable storage medium 806, a first wireless communication interface 808 and a second wireless communication interface 810. The audio gateway device 802 may also include multiple subscriber identity modules (SIMs) 812 and 814 coupled to the processing circuit 804. The first wireless communication interface 808 may include a first transmitter/receiver circuit 816 and may serve to communicate with devices over a long range communication network (e.g., telephony network, subscriber communication network, etc.). The second wireless communication interface 810 may include a second transmitter/receiver circuit 818 and may serve to communicate with a hands free device over a short range communication link (e.g., Bluetooth, etc.).

The processing circuit 804 may include or implement a telephony circuit/module 822 used to interface and/or communicate over the first wireless communication interface 808 to process incoming and/or outgoing calls. The processing circuit 804 may also include or implement a hands free device interface circuit/module 826 used to interface and/or communicate over the second wireless communication interface 810 to process incoming and/or outgoing calls to/from a hands free device. The processing circuit 804 may also include or implement a call management circuit/module 824 to manage calls via the multiple subscriber identity modules (SIMs) 812 and 814.

The call management module 824 may keep track of the state of all subscriptions and calls states thereon on behalf of or instead of the hands free device. For example, the call management module 824 may track which is the current or preferred subscription 838 being used by the hands free device and/or the non-preferred subscription, as well as the call states 836 for both the preferred subscription and non-preferred subscriptions.

The machine-readable storage medium 806 may include telephony instructions 830, call management instructions 832, and hands free device call instructions 834. In one example, the telephony instructions 830 may facilitate communications over the telephony communication network by: (a) providing instructions to receive incoming calls from the long range communication network (via the first wireless communication interface 808), and (b) providing instructions to send outgoing calls from the hands free device over the long range communication network (via the first wireless communication interface 808). In another example, the call management instructions 832 may facilitate management of calls for the first subscriber identity module 812 and second subscriber identity module 814 by: (a) maintaining the status of a currently selected or preferred subscription 838 (and/or non-preferred subscription), and/or (b) and the call states for each subscription 836. The hands free device call instructions 834 may facilitate termination and/or origination of calls with the hands free device by: (a) sending one or more commands to the hands free device when an incoming call is received on a subscription, and (b) receiving one or more commands from the hands free device when an incoming call is accepted an outgoing call is originated by the hands free device.

Figure 9:
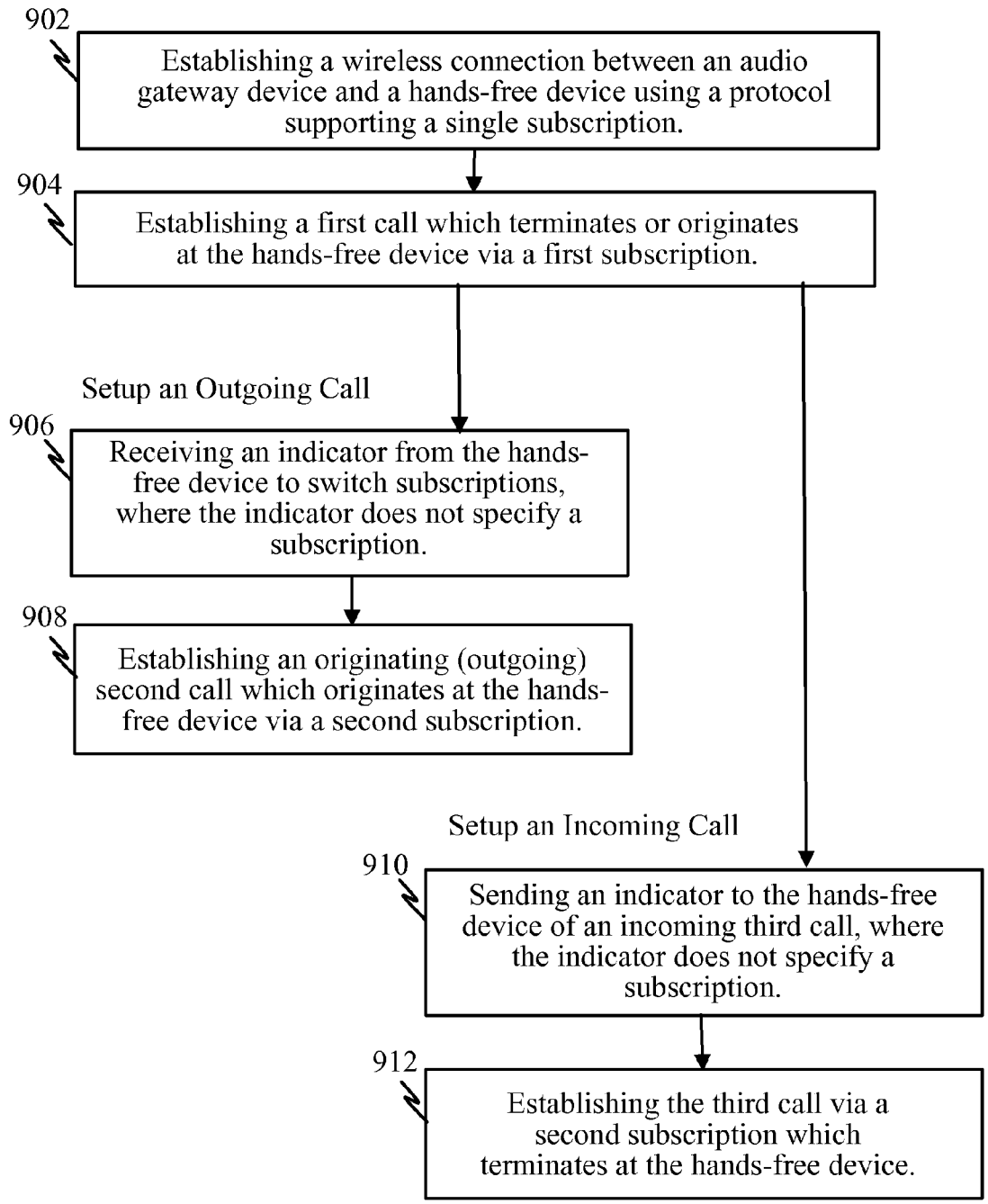
FIG. 9 illustrates a method operational on a multi-SIM (subscriber identity module) audio gateway device.

FIG. 9 illustrates a method operational on a multi-SIM (subscriber identity module) audio gateway device. A wireless connection or link may be established between the audio gateway device and a hands free device using a protocol supporting a single subscription 902. That is, such protocol may not provide a mechanism to identify distinct subscriptions to the hands free device. Consequently, the hands free device may not be capable of distinguishing or selecting between subscriptions. For a multi-subscription audio gateway device, a first subscription may be initially selected as a preferred subscription.

A first call which terminates or originates at the hands free device may be established via the first subscription 904. Subsequently, an outgoing call may be setup via a second subscription by: (a) receiving a first indicator from the hands free device to switch subscriptions, where the first indicator does not specify a subscription 906; and (b) establishing an originating second call via a second subscription which originates at the hands free device 908. Upon receipt of the first indicator, the audio gateway device may switch from the first subscription to the second subscription (if available). If a second subscription is not available, then the audio gateway device may send a failure indicator to the hands free device, which may then opt not to originate the second call, or may originate the second call over the first subscription (e.g., by placing any active call over the first subscription on hold).

Similarly, an incoming call may be setup via a second subscription by: (a) sending a second indicator to the hands free device of an incoming third call, where the second indicator does not specify a subscription 910; and (b) establishing the third call via a second subscription which terminates at the hands free device 912. That is, the second indicator merely indicates that the third call is incoming, but not that it is from a different or second subscription than the first call. The hands free device may then choose to accept the third call or decline it.

Exemplary Hands Free Device and Method Operational Thereon

Figure 10:
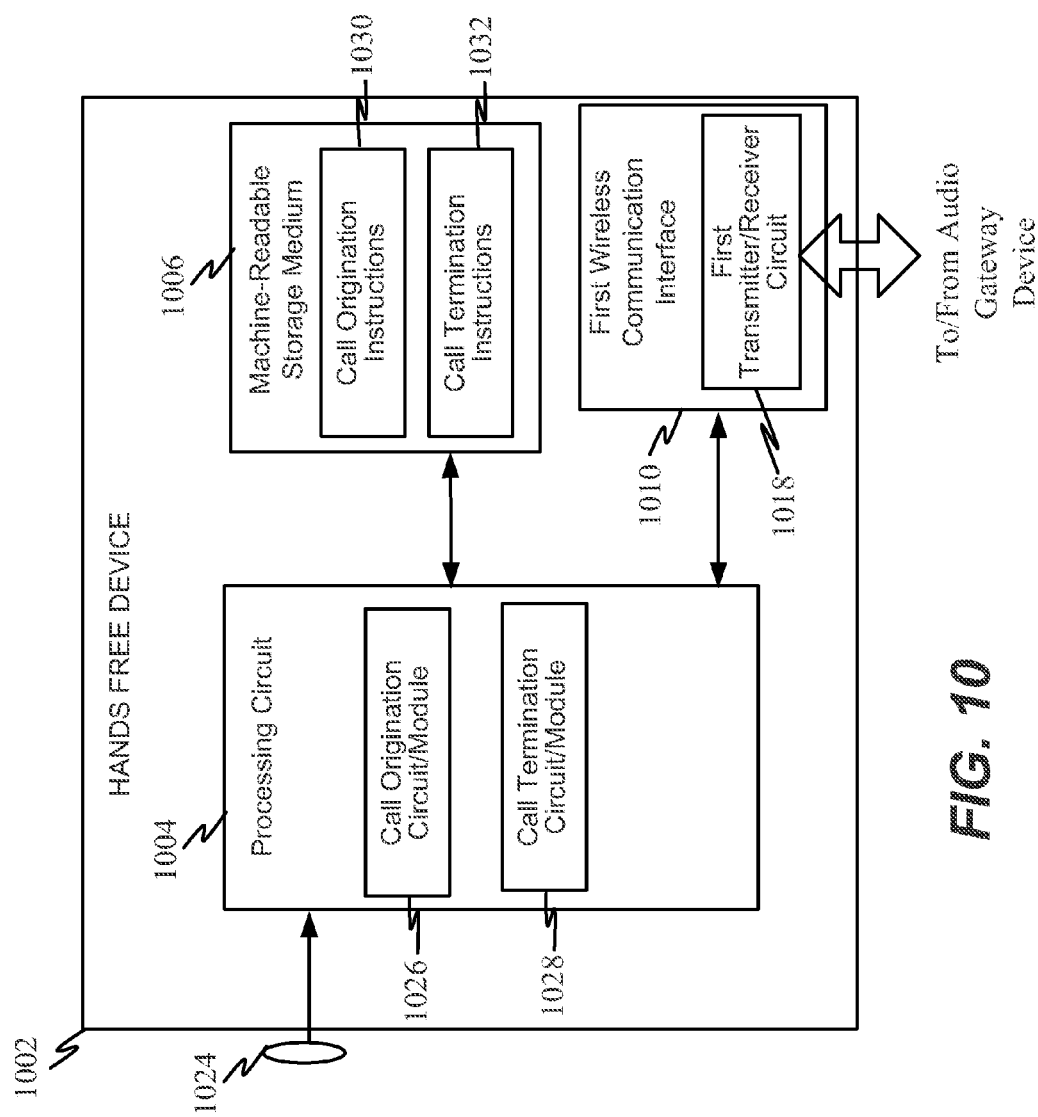
FIG. 10 is a block diagram illustrating an exemplary hands free device adapted to facilitate calls over multiple subscriptions when the hands free device only support a single subscription.

FIG. 10 is a block diagram illustrating an exemplary hands free device adapted to facilitate calls over multiple subscriptions when the hands free device only support a single subscription. The hands free device 1002 may include a processing circuit 1004, a machine-readable storage medium 1006, and a first wireless communication interface 1010. The first wireless communication interface 1010 may include a first transmitter/receiver circuit 1018 and may serve to communicate with an audio gateway device over a short range communication link (e.g., Bluetooth, etc.). It should be noted that the hands free device 1002 does not include any subscriber cards, does not receive or obtain subscription information, and/or does not identify a particular subscription when making an outgoing call.

The processing circuit 1004 may include or implement a call origination circuit/module 1026 that permits a user of the hands free device 1002 to initiate an outgoing call. The call origination circuit/module 1026 may also receive and/or accept an input from a user requesting to switch subscriptions prior to originating an outgoing call. For example, the hands free device may include one or more buttons 1024 that allows a user to indicate a desire to change subscriptions, initiate an outgoing call through the audio gateway device, place a call on hold, terminate a call, and/or accept an incoming call.

The processing circuit 1004 may include or implement a call termination circuit/module 1028 that permits a user of the hands free device 1002 to accept or reject an incoming call. For instance, the call termination module may be coupled to one or more buttons 1024 on the hands free device or coupled to the hands free device that permit answering/rejecting an incoming call and/or placing a current call on hold.

The machine-readable storage medium 1006 may include call origination instructions 1030 to facilitate origination of outgoing calls through the audio gateway device. For example, the call origination instructions may serve to detect a request to switch subscriptions from a user, send an indicator to switch subscriptions to the audio gateway device, receive a phone number to call, send a call request with the phone number to the audio gateway device, and receive an acknowledgement when the outgoing call has been placed.

The machine-readable storage medium 1006 may also include call termination instructions 1032 to facilitate termination of incoming calls through the audio gateway device. For example, the call termination instructions may serve to receive an indicator of an incoming call from the audio gateway device, accept and/or reject the incoming call while placing other pending calls on hold and/or terminating those other calls.

Figure 11:
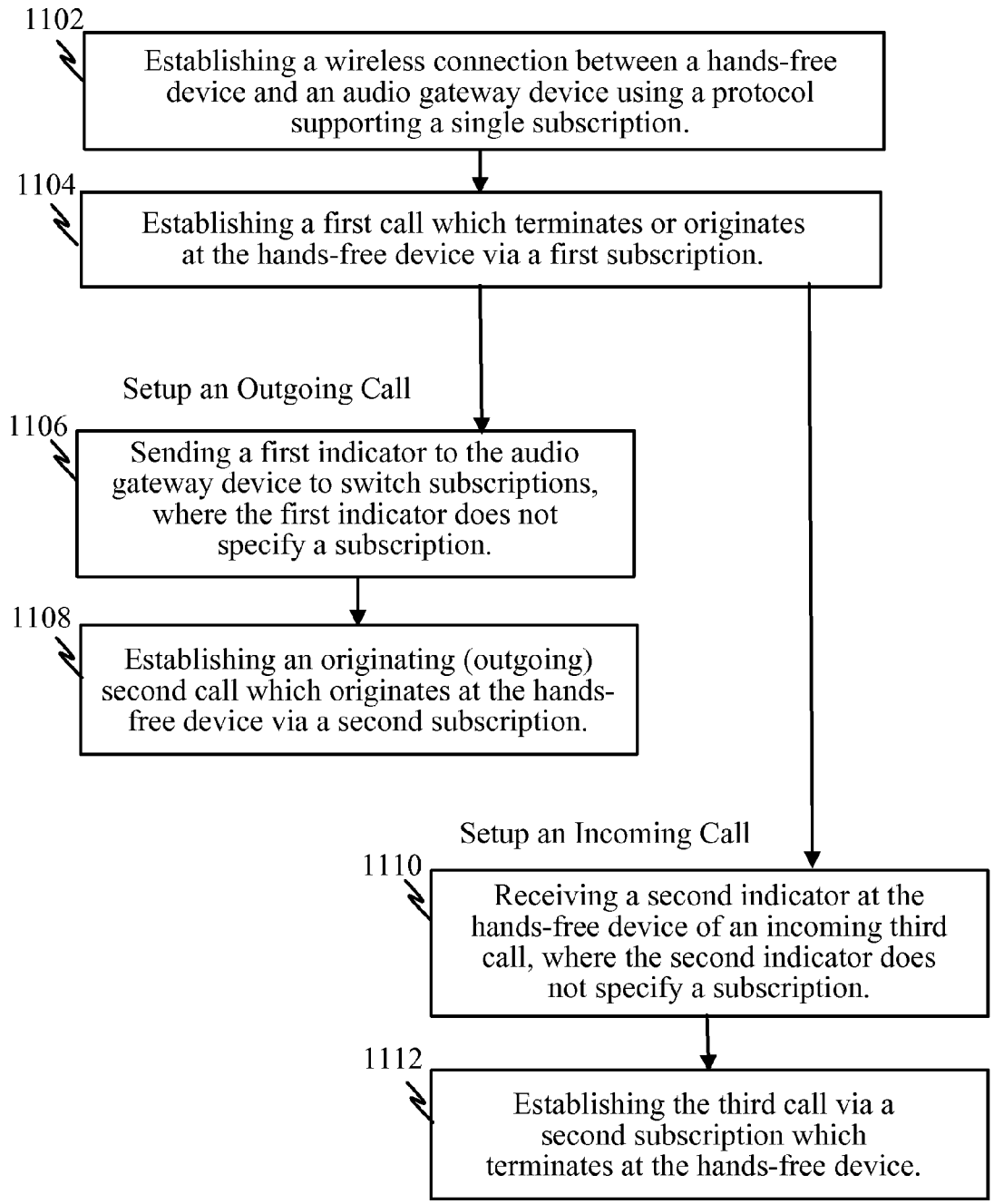
FIG. 11 illustrates a method operational on a hands free device.

FIG. 11 illustrates a method operational on a hands free device. A wireless connection may be established between the hands free device and an audio gateway device using a protocol supporting a single subscription 1102. A first call which terminates or originates at the hands free device may also be established via a first subscription 1104. An outgoing call may be setup via a second subscription by: (a) sending a first indicator to the audio gateway device to switch subscriptions, where the first indicator does not specify a subscription 1106; and (b) establishing an originating second call via a second subscription which originates at the hands free device 1108. Similarly, an incoming call may be setup via a second subscription by: (a) receiving a second indicator at the hands free device of an incoming third call, where the second indicator does not specify a subscription 1110; and (b) establishing the third call via a second subscription which terminates at the hands free device 1112.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a multi-subscriber identity module audio gateway device, comprising:
    establishing a wireless connection between the audio gateway device and a hands free device using a protocol supporting a single subscription;
    establishing a first call which terminates or originates at the hands free device via a first subscription;
    setting up an outgoing call via a second subscription by:
        receiving a first indicator from the hands free device to switch subscriptions, where the first indicator does not specify a subscription;
        establishing an originating second call via the second subscription which originates at the hands free device; and
    setting up an incoming call via the second subscription by:
        sending a second indicator to the hands free device of an incoming third call, where the second indicator does not specify a subscription; and
        establishing the third call via the second subscription which terminates at the hands free device.

2. The method of claim 1, wherein the first call is placed on hold when the second call is established.

3. The method of claim 1, wherein the second call is placed on hold when the third call is established.

4. The method of claim 1, wherein the first indicator and second indicator reuse a command from the protocol.

5. The method of claim 1, wherein the first indicator indicates a relative switch from a current subscription to another subscription.

6. The method of claim 1, wherein the audio gateway device manages calls for two or more subscriptions where such calls originate or terminate at the hands free device but without conveying subscription information to the hands free device.

7. The method of claim 1, wherein the audio gateway device manages calls for two or more subscriptions where such calls originate or terminate at the hands free device but without identifying a specific subscription to the hands free device.

8. The method of claim 1, wherein the audio gateway device is communicatively coupled to a wireless network, distinct from the wireless connection with the hands free device, through which voice calls are transmitted to and from the audio gateway device.

9. The method of claim 1, wherein the audio gateway device maintains status information for all calls and subscriptions on behalf of the hands free device.

10. The method of claim 1, wherein no subscription information is transmitted from the audio gateway device to the hands free device.

11. An audio gateway device, comprising a first wireless communication interface to communicate with a telephony network;
    a second wireless communication interface to communicate with a hands free device;
    a first subscriber identity module to facilitate calls via a first subscription;
    a second subscriber identity module to facilitate calls via a second subscription;
    a processing circuit coupled to the first wireless communication interface, the second wireless communication interface, the first subscriber identity module, and the second subscriber identity module, and configured to
    establish a wireless connection between the audio gateway device and the hands free device using a protocol supporting a single subscription;
    establish a first call which terminates or originates at the hands free device via the first subscription;
    setup an outgoing call via the second subscription by:
    receiving a first indicator from the hands free device to switch subscriptions, where the first indicator does not specify a subscription; and
    establishing an originating second call via the second subscription which originates at the hands free device; and
    setup an incoming call via the second subscription by:
    sending a second indicator to the hands free device of an incoming third call, where the second indicator does not specify a subscription; and
    establishing the third call via the second subscription which terminates at the hands free device.

12. The audio gateway device of claim 11, wherein the first call is placed on hold when the second call is established.

13. The audio gateway device of claim 11, wherein the second call is placed on hold when the third call is established.

14. The audio gateway device of claim 11, wherein the first indicator and second indicator reuse a command from the protocol.

15. The audio gateway device of claim 11, wherein the first indicator indicates a relative switch from a current subscription to another subscription.

16. The audio gateway device of claim 11, wherein the audio gateway device manages calls for two or more subscriptions where such calls originate or terminate at the hands free device but without identifying a specific subscription to the hands free device.

17. A method operational on a hands free device, comprising:
    establishing a wireless connection between the hands free device and an audio gateway device using a protocol supporting a single subscription;
    establishing a first call which terminates or originates at the hands free device via a first subscription;
    setting up an outgoing call via a second subscription by:
    sending a first indicator to the audio gateway device to switch subscriptions, where the first indicator does not specify a subscription;
    establishing an originating second call via the second subscription which originates at the hands free device;
    setting up an incoming call via a second subscription by:
    receiving a second indicator at the hands free device of an incoming third call, where the second indicator does not specify a subscription; and
    establishing the third call via the second subscription which terminates at the hands free device.

18. The method of claim 17, wherein the first call is placed on hold when the second call is established.

19. The method of claim 17, wherein the second call is placed on hold when the third call is established.

20. The method of claim 17, wherein the first indicator and second indicator reuse a command from the protocol.

21. The method of claim 17, wherein the first indicator indicates a relative switch from a current subscription to another subscription.

22. The method of claim 17, wherein the hands free device receives no subscription information from the audio gateway device.

23. A hands free device, comprising:
    a first wireless communication interface to communicate with an audio gateway device;
    a processing circuit coupled to the first wireless communication interface and configured to
    establish a wireless connection between the hands free device and the audio gateway device using a protocol supporting a single subscription;
    establish a first call which terminates or originates at the hands free device via a first subscription;
    setup an outgoing call via a second subscription by:
    sending a first indicator to the audio gateway device to switch subscriptions, where the first indicator does not specify a subscription;
    establishing an originating second call via the second subscription which originates at the hands free device;
    setup an incoming call via the second subscription by:
    receiving a second indicator at the hands free device of an incoming third call, where the second indicator does not specify a subscription; and
    establishing the third call via the second subscription which terminates at the hands free device.

24. The hands free device of claim 23, wherein the first call is placed on hold when the second call is established.

25. The hands free device of claim 23, wherein the second call is placed on hold when the third call is established.

26. The hands free device of claim 23, wherein the first indicator and second indicator reuse a command from the protocol.

27. The hands free device of claim 23, wherein the first indicator indicates a relative switch from a current subscription to another subscription.

* * * * *